United States Patent

[11] 3,587,015

| [72] | Inventor | William N. Mitchell |
| | | P.O. Box 11, Ochopee, Fla. 33943 |
| [21] | Appl. No. | 881,449 |
| [22] | Filed | Dec. 2, 1969 |
| [45] | Patented | June 22, 1971 |

[54] MAGNETIC ROTOR ASSEMBLY
9 Claims, 5 Drawing Figs.

[52] U.S. Cl. .................................................. 335/227,
310/103
[51] Int. Cl. .................................................. H02k 49/00
[50] Field of Search .......................................... 335/272,
225, 227; 174/572, 574;
310/153, 103

[56] References Cited
UNITED STATES PATENTS
3,235,759  2/1966  Bowie ........................... 310/103
3,312,887  4/1967  Reese et al ..................... 310/103
3,382,386  5/1968  Schlaeppi ....................... 310/103

Primary Examiner—Bernard A. Gilheany
Assistant Examiner—F. E. Bell
Attorneys—Clarence A. O'Brien and Harvey B. Jacobson ABSTRACT: Torque applied to a rotor produces reciprocation of magnetic assemblies in radial guides between limit positions approaching angularly spaced flux-conducting flange sections fixed to the frame on which the rotor is mounted. The magnetic assemblies are reciprocated in synchronized relation to rotation of the rotor and are provided with spaced pole faces magnetically bridged by the angularly spaced flux-conducting flange sections which form a circular track along which the radial guides travel.

PATENTED JUN 22 1971

William N. Mitchell
INVENTOR.

BY Clarence A. O'Brien
and Harvey B. Jacobson
Attorneys

PATENTED JUN22 1971
3,587,015
SHEET 2 OF 2
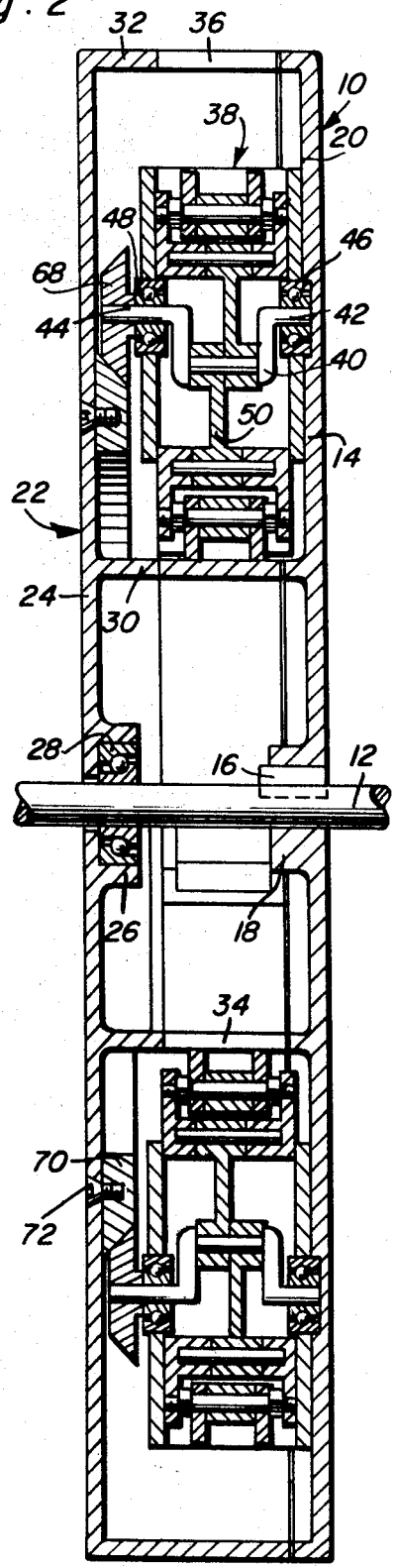
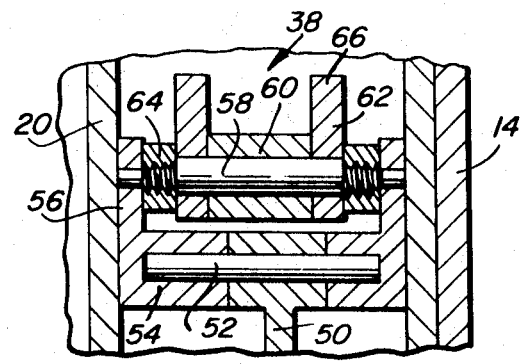
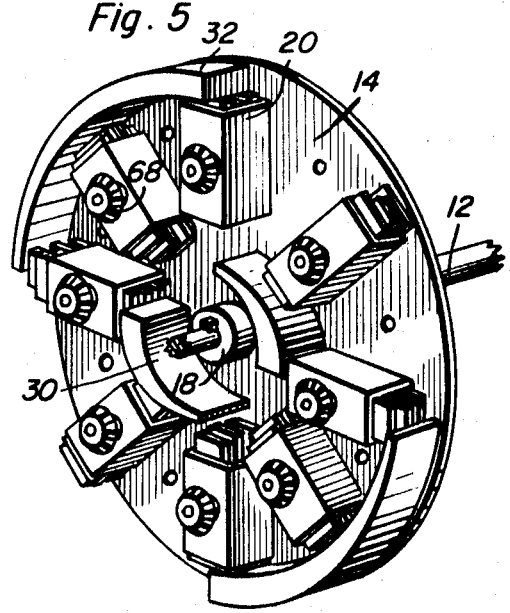
William N. Mitchell
INVENTOR.
BY Clarence A. O'Brien
and Harvey B. Jacobson
Attorneys

MAGNETIC ROTOR ASSEMBLY

This invention relates to a rotor assembly or magnetic flywheel for absorbing and releasing torque during each revolution of the rotor assembly and for other possible benefits.

In accordance with the present invention, rotation is imparted to a rotor assembly when torque is applied from some power source, with the torque loading being varied by magnetic attractive forces. Permanent magnet assemblies having spaced pole faces are slidably mounted by radial guides carried by the rotor for reciprocation between limit positions bringing the spaced pole faces into proximity with flux gap-bridging elements fixed to the rotor frame which are in the form of radially spaced guides along which the radial guides travel during rotation of the rotor. The reciprocatory movement of the magnets are synchronized with the rotation of the rotor by a counterbalanced crank and planetary gear arrangement. Thus, the rotor assembly acts as a magnetic flywheel in regulating the torque applied to a power shaft for example.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 2 is a side sectional view taken substantially through a plane indicated by section line 2–2 in FIG. 1.

FIG. 3 is an enlarged partial sectional view of a portion of the rotor assembly shown in FIG. 2.

FIG. 5 is a perspective view showing the rotor assembly disassembled from its associated frame structure.

Figure 1:
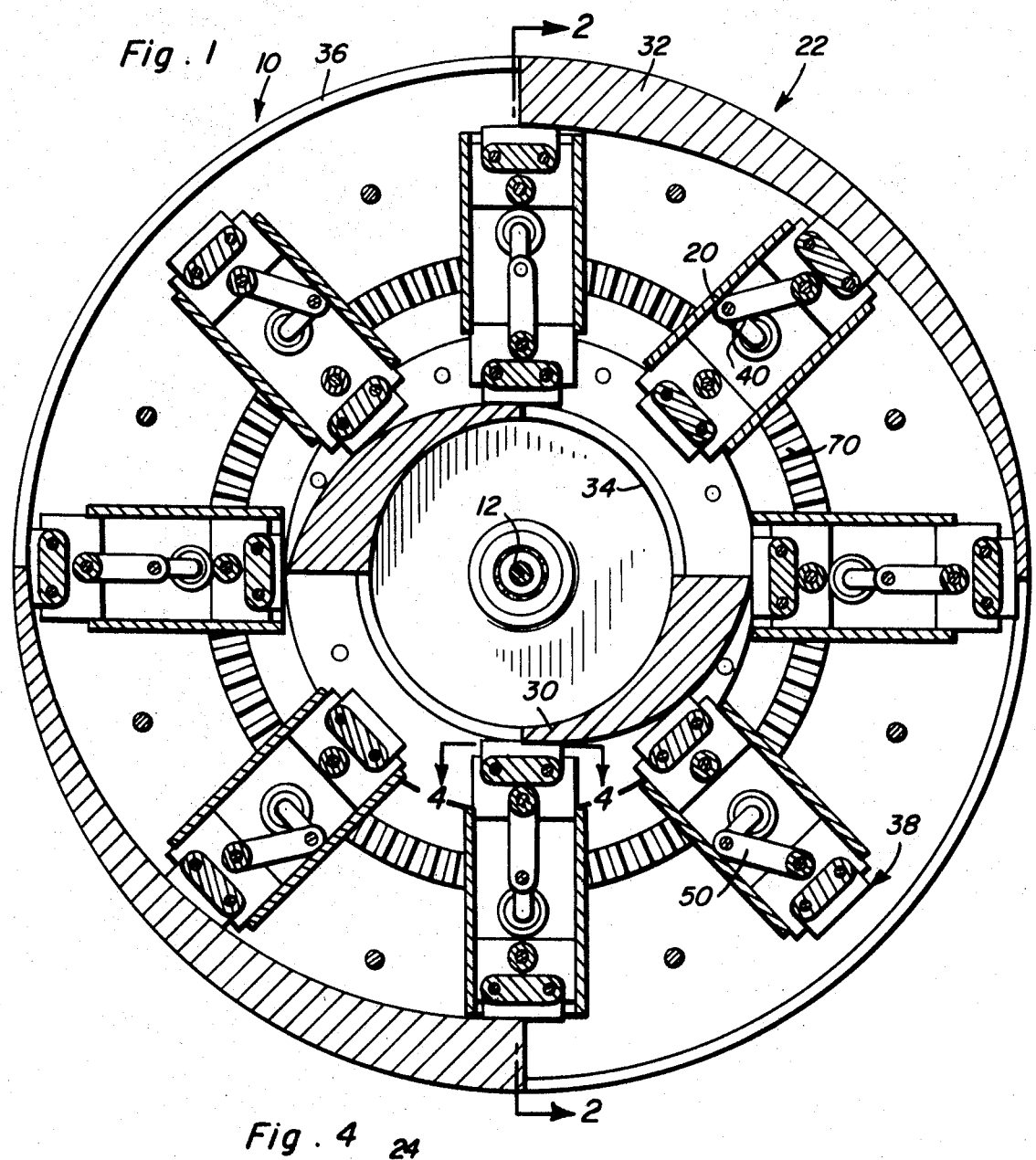
FIG. 1 is a front sectional view through a rotor assembly constructed in accordance with the present invention.
Figure 4:
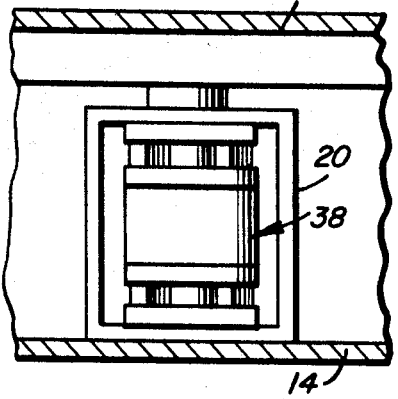
FIG. 4 is an enlarged partial sectional view taken substantially through a plane indicated by section line 4—4 in FIG. 1.

Referring now to the drawings in detail, and in particular to FIGS. 1, 2 and 5, the rotor assembly generally denoted by reference numeral 10 is associated with any suitable power shaft such as the shaft 12 to which a rotor disc 14 is connected by the spline 16 extending through the radially inner hub portion 18 of the rotor disc. The rotor disc fixedly mounts a plurality of radial guide tubes 20. The rotor disc 14 and the guide tubes 20 fixed thereto are made of a nonmagnetic material or one having a relatively high magnetic reluctance property. Further, while any desired number of guide tubes 20 may be utilized in accordance with the present invention, eight of such guide tubes are illustrated in the disclosed embodiment in equal angular spaced relationship to each other.

The rotor disc 14 and the power shaft 12 to which it is connected, are supported in any suitable manner for rotation about the longitudinal axis of the shaft 12 and in concentric relation to an associated frame structure generally denoted by reference numeral 22 in FIGS. 1 and 2. The frame structure 22 includes a disc portion 24 having a hub 26 which mounts a ball bearing assembly 28 journaling the power shaft 12. Extending axially from the frame disc 24, are radially inner guides 30 and radially outer guides 32. These guides are made of a material having a relatively low magnetic reluctance property. Further, the guides are angularly spaced by gaps 34 and 36 for alternate engagement with radially inner and outer end portions of the guide tubes 20. In the illustrated embodiment, there are two radially inner guides 30 and two radially outer guides 32 that alternately extend by 90 degrees about the rotational axis of the shaft 12.

Slidably mounted within each of the guide tubes 20, are a pair of magnetic assemblies generally referred to by reference numeral 38. The two magnetic assemblies 38 in each guide tube counterbalance each other with respect to a crank 40 having a crankshaft sections 42 and 44 rotatably mounted within bearing assemblies 46 and 48 in opposite sidewalls of the guide tube 20. The magnetic assemblies 38 are connected in 180° relationship to each other to the crank 40 by connecting rods 50. Each connecting rod is pivotally connected by a wrist pin 52 as more clearly seen in FIG. 3 to tubular formations 54 projecting from a pair of nonmagnetic slide plates 56, in sliding engagement with the opposite walls of the guide tube 20. A mounting bolt assembly 58 is interconnected between the side plates 56 and supports in the illustrated embodiment, an Alnico type of permanent magnet core 60 held clamped between pole face plates 62 of opposite polarity by assembly nuts 64. The pole plates 62 present pole faces 66 of opposite polarity adapted to be magnetically bridged by the flux-conducting sections of flange portions 30 and 32 as the magnetic assemblies 38 approach limit positions at the radially inner or outer ends of the guide tubes 20.

The reciprocatory movement of the magnetic assemblies 38 are synchronized with rotation of the rotor disc 14 so that the magnetic assemblies will be in engagement with the guides 30 and 32 as shown in FIG. 1 and be magnetically attracted thereto so as to exert accelerating force on the magnetic assemblies tending to rotate the crank in the same direction. Toward this end, the crankshaft section 44 projecting from each of the guide tubes 20, is connected to a planet bevel gear 68. The planet bevel gears 68 are in constant mesh with a reaction bevel gear 70 fixed to the frame disc 24 by fasteners 72. Accordingly, as the rotor disc 14 is rotated about the axis of shaft 12, the planet bevel pinions 68 are rotated to impart synchronized reciprocation to the magnetic assemblies 38 through the crank and pitman connection between the planet bevel pinions and the magnetic assemblies within each guide tube. It will be apparent therefore, that as each magnetic assembly is approaching either the radially outer or radially inner limit position, it experiences an attractive force because of the magnetic coaction with the radially inner or outer guides.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What I claim as new is as follows:

1. A magnetic torque regulating device comprising a frame having radially inner and outer guides, said guides being made of low magnetic reluctance material, a rotor rotatably mounted by the frame, radial guide means mounted by the rotor between the inner and outer guides, magnetic flux-emitting means movably mounted by the guide means for movement between limit positions alternately engaging said inner and outer guides, and drive means connected to the flux-emitting means for synchronizing rotation of the rotor with said movement of the flux-emitting means between said limit positions.

2. The combination of claim 1 wherein said magnetic flux-emitting means includes magnets slidably mounted within the guide means having spaced pole faces adapted to be magnetically bridged by the guides in engagement therewith.

3. The combination of claim 2 wherein said drive means includes crank means rotatably mounted by the guide means and connected to the flux-emitting means, a reaction gear member fixedly mounted on the frame, and planet pinion means connected to the crank means in constant meshing engagement with the reaction gear member.

4. The combination of claim 3 wherein said guides are angularly spaced apart by nonmagnetic gaps.

5. The combination of claim 1 wherein said drive means includes crank means rotatably mounted by the guide means and connected to the flux-emitting means, a reaction gear member fixedly mounted on the frame, and planet pinion means connected to the crank means in constant meshing engagement with the reaction gear member.

6. The combination of claim 5 wherein said guides are angularly spaced apart by nonmagnetic gaps.

7. The combination of claim 1 wherein said guides are angularly spaced apart by nonmagnetic gaps.

8. A magnetic torque regulating device comprising a frame having a guide assembly made of low magnetic reluctance material, a rotor rotatably mounted by the frame, radial guide means mounted by the rotor for movement through the guide assembly, magnetic flux-emitting means movably mounted by the guide means for movement between limit positions, and drive means connected to the flux-emitting means for synchronizing rotation of the rotor with said movement of the flux-emitting means between said limit positions.

9. The combination of claim 8 wherein said guide assembly is provided with angular spaced flux gaps therein.